Nov. 1, 1966   S. H. AULD ETAL   3,283,235
CEMF RESPONSIVE SERIES MOTOR CONTROL CIRCUIT
Filed Feb. 4, 1964   2 Sheets-Sheet 1

United States Patent Office 3,283,235
Patented Nov. 1, 1966

3,283,235
CEMF RESPONSIVE SERIES MOTOR CONTROL CIRCUIT
Samuel H. Auld and Gary R. Shier, Wichita, Kans., assignors to Lear Jet Corporation, Wichita, Kans., a corporation of Delaware
Filed Feb. 4, 1964, Ser. No. 342,511
3 Claims. (Cl. 318—331)

This invention relates to motor speed control means and in a more specific aspect to means for regulating and controlling the amount of energy supplied to a motor or the like for controlling the speed of the motor in operation. In a more specific aspect the invention relates to motor control means wherein the back electromotive force generated during operation of the motor is utilized in controlling the motor speed.

Various motor speed control means are known to the art, including motor speed control means utilizing back E.M.F. generated during operation of the motor. Some of the prior art control means result in rough or erratic operation of the motor, particularly at low operating speeds where very little back E.M.F. is generated. In other instances, the motor speed control means of the prior art are structurally complicated or bulky and therefore not desirable for use in many applications. Some of the prior art controls result in variable torque speed and inadequate control, particularly at heavy loads and/or low motor speeds.

In accordance with the present invention new control circuit means for a load are provided which includes a controlled rectifier connectible to a load and having a gate electrode. A gating circuit is connected to the electrode of the controlled rectifier and is connectible to a source of voltage and is operable to gate the rectifier into a conducting state when voltage is applied to the gating circuit. In addition, the rectifier means are electrically connected to the controlled rectifier and connected in parallel to the load.

Accordingly, it is an object of the invention to provide a new motor speed control means.

Another object of the invention is to provide new motor speed control means wherein the back E.M.F. generated during operation of the motor is utilized to control operation of the motor.

Another object of the invention is to provide new universal motor speed control means having desirable control qualities even at low motor speeds so that relatively flat torque speed characteristics can be obtained.

Another object of the invention is to provide new universal motor speed control means including a controlled rectifier in series with a motor winding wherein the controlled rectifier is by-passed to provide energy to the motor winding even when energy is not passing through the controlled rectifier.

Another object of the invention is to provide new universal motor speed control means having means to prevent or eliminate kickback as a result of armature voltage collapsing during the half cycle of operation when energy is not supplied to the armature.

A still further object of the invention is to provide new universal motor speed control means which can be connected to a motor or the like without modification or change in the motor structure itself.

Various other objects, advantages and features of the invention will become apparent to those skilled in the art from the following description taken in conjunction with the accompanying drawings, in which.

Figure 1:
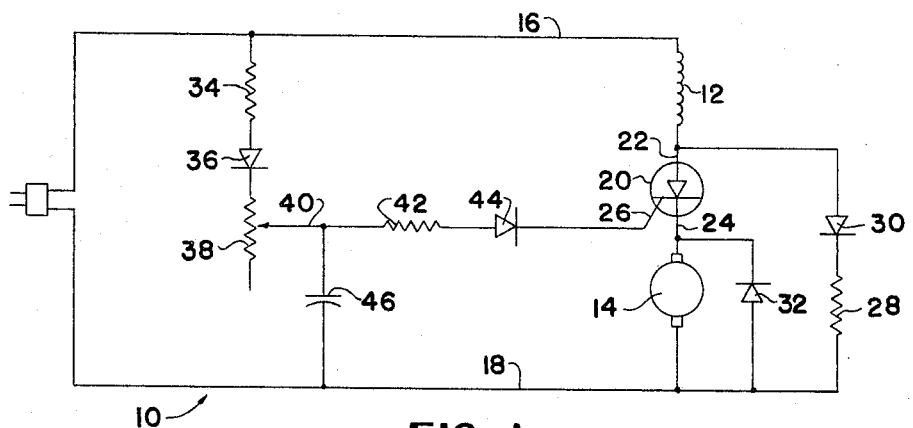
FIG. 1 is a schematic diagram illustrating a preferred specific embodiment of a new universal motor speed control means of the invention.

The following is a discussion and description of preferred specific embodiments of the new universal motor speed control means of the invention, such being made with reference to the drawing whereupon the same reference numerals are used to indicate the same or similar parts and/or structure. It is to be understood that such discussion and description is not to unduly limit the scope of the invention.

Referring now to the drawings in detail, a preferred specific embodiment of a new universal motor speed control circuit of the invention is shown generally at 10 in FIG. 1 and is preferably used in connection with common motors which have a field winding 12 and an armature winding 14 in the drawings. The field winding 12 and armature winding 14 are connectable to a source of A.C. voltage in any suitable manner, such as by the use of conductors 16 and 18, respectively.

Controlled rectifier means, preferably a silicon controlled rectifier 20, is provided and is connected in series between the field winding 12 and the armature winding 14. As shown in the drawings, the anode electrode 22 of the rectifier 20 is connected to the field winding 12 and the cathode electrode 24 is connected to the armature winding 14. Thus, when the conductors 16 and 18 are connected to a source of A.C. voltage and the rectifier is gated into a conducting state, current will flow through the field winding 12, rectifier 20 and armature winding 14 during the positive half cycle of the applied voltage and the rectifier 20 is operable to regulate or determine the amount of electrical energy being supplied to the armature winding 14 for operation of the motor. The rectifier 20 additionally includes a gate electrode 26 which is connectible to a gating or triggering circuit as explained hereinafter with operation of the gating circuit determining the time in the cycle of the applied voltage at which the rectifier 20 is gated into a conducting state to provide energy to the armature winding 14.

Preferably, a resistor 28 and a diode 30 are provided and connected in series with each other and connected in parallel to the controlled rectifier 20 and to the armature winding 14 as illustrated in FIG. 1. The diode 30 and resistor 28 provide means for by-passing electrical energy around the rectifier 20 and the armature winding 14 when the rectifier 20 is in a blocking state or condition. A second diode 32 is also preferably provided and is connected in parallel to the armature winding 14 and the polarity of the diode 32 is opposite from the polarity of the diode 30 as shown in the drawings.

A gating circuit is preferably provided and connected to the gate electrode 26 of the controlled rectifier 20. As shown in the drawings the gating circuit includes a resistor 34 which is connected to conductor 16 or to other means to provide a source of electric current to the gating circuit and the other end of the resistor 34 is connected to a diode 36. The diode 36 is also connected to the resistance member 38 of a variable resistor or potentiometer. The wiper 40 of the potentiometer or variable resistor is connected to another resistor 42 which in turn is connected to a diode 44 which is electrically connected to the gate electrode 26 of the controlled rectifier 20. A capacitor 46 can also be provided and connected between the wiper arm 40 and resistor 42 and to the conductor 18 between the armature winding 14 and the source of voltage in the manner illustrated in the drawings. The diodes 36 and 44 are connected in the circuit as illustrated in the drawings to have the proper polarity in relation to the controlled rectifier 20 so that electrical energy flows through the gating circuit during the same half cycle of the applied A.C. voltage that the energy can flow through the rectifier 20 when gated into a conducting state.

In operation, the control circuit 10 of the invention is connectible to a source of A.C. voltage or the like by the conductors 16 and 18 which simultaneously applies the A.C. voltage to the rectifier 20 and to the gating circuit therefor. The rectifier 20 is gated into a conducting state at the time in the cycle of the applied A.C. voltage which is determined by setting of the wiper arm 40 on resistor 38, maximum movement of the wiper arm 40 in a clockwise direction as shown in FIG. 1 resulting in substantially immediate gating of the rectifier 20 to provide substantially an entire full half wave of the applied A.C. voltage through the motor windings 12 and 14. Movement of the wiper arm 40 to the other extreme results in very little or no electrical energy passing through the rectifier 20. In addition, the time at which the rectifier 20 is gated into a conducting state is determined in part by the back E.M.F. generated by the armature winding 14 during rotation thereof. As the motor accelerates the back E.M.F. is developed by the armature and the controlled rectifier 20 will stop conducting and the speed will be regulated by the amount of back E.M.F. and the setting of the wiper arm 40 on the potentiometer 38. When the load is applied to the motor and motor tends to slow down and the back E.M.F. is reduced and thus the cathode electrode 24 of the rectifier 20 becomes more negative than the gate electrode 26 and the controlled rectifier conducts, once more applying voltage to the load.

With the circuit of the invention accurate and desirable motor speed control can be obtained even at relatively low motor speeds where the back E.M.F. is relatively small. This is obtained in the circuit of the invention by the provision of the resistor 28 and diode 30 by-passing the rectifier 20 and armature winding 14. More specifically, since the back E.M.F. of the armature is used to regulate the effective conducting time or state of the controlled rectifier 20, it is desirable to have a large amount of back E.M.F. even at relatively low motor speeds so that the feed back is more effective. The back E.M.F. of the motor is a function of the field strength and also the speed of the armature and thus by providing the diode 30 and resistor 28 connected as shown and described the field 12 is excited with more or additional current passing through it and through the diode 30 and resistor 28 even when rectifier 20 is in a blocking state. Thus, the field strength is increased and also the back E.M.F. of the motor is increased. By having this increased back E.M.F., better speed regulation is available than can be obtained in the absence of these two components.

Figure 3:
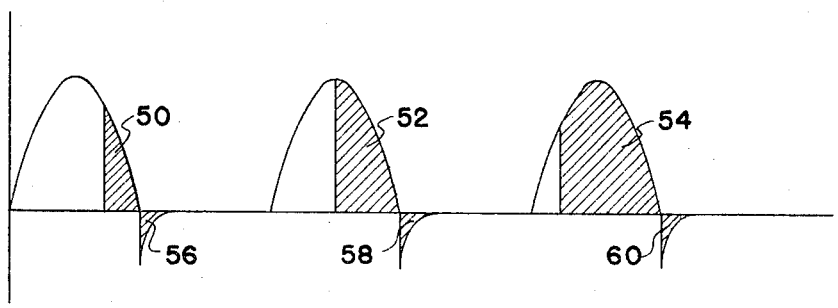
FIG. 3 is a diagrammatic view showing portions of the applied A.C. voltage supplied to the armature winding during operation and illustrating the effect of kickback obtained without portions of the circuit of FIG. 1.
Figure 2:
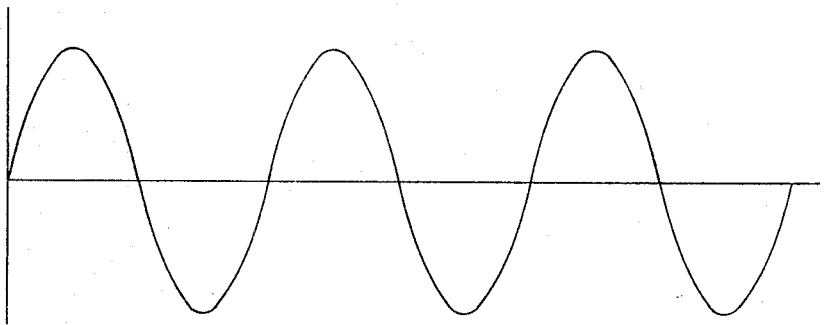
FIG. 2 is a diagrammatic view illustrating the applied A.C. voltage for the circuit of FIG. 1.

Assuming that the applied voltage has the wave form illustrated in FIG. 2, then the amount of energy supplied to the armature winding 14 under various conditions is illustrated in FIG. 3, the shaded portion shown at 50 illustrating a relatively small amount of energy being supplied to the load as a result of setting of the wiper arm 40 and operation of the motor and with the portions shown at 52 and 54 being for settings of the potentiometer 40 which result in faster or earlier gating of the controlled rectifier 20 into a conducting state.

Figure 4:
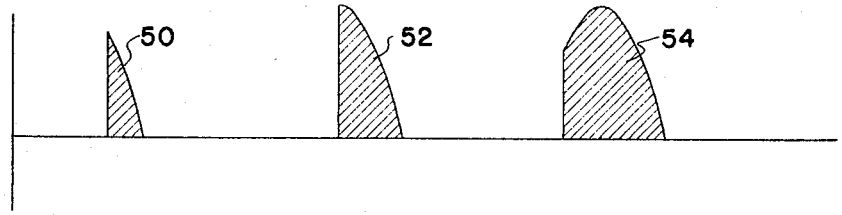
FIG. 4 is a view similar to FIG. 3 illustrating elimination of the kickback by addition of an element of the circuit of FIG. 1.

Also shown in FIG. 3 of the drawings are shaded portions shown at 56, 58 and 60 illustrating a portion of the negative half cycle applied to the load. In the absence of diode 32 and during the negative half cycle of the applied voltage of FIG. 2, the armature voltage tends to collapse and thus kickback is obtained as illustrated at 56, 58 and 60. By providing the diode 32 connected as shown in the drawings, this kickback as shown at 56, 58 and 60 is eliminated, and the energy that might have been lost is thus captured. Such also increases the back E.M.F. and thus the control of the motor. FIG. 4 of the drawings illustrates the electrical energy supplied to the load by utilizing the circuit including the resistance 28 and diode 30 and in addition the diode 32 and it will be observed that the kickback shown at 56, 58 and 60 has been eleminated.

By providing the components shown at 28, 30 and 32 the circuit of the invention contains a large amount of back E.M.F. and regulation of the amount of back E.M.F. is obtained by adjustment of the wiper arm 40 on resistor 38 to thus determine the amount of resistance in the gating circuit and thus time in which the controlled rectifier 20 is gated into a conducting state. With many motors low hysteresis iron in the fields are present and as a result an insufficient amount of back E.M.F. is available which results in relatively poor control. However, the addition of the components 28, 30 and 32 substantially increase the back E.M.F. as previously explained and the circuit of the invention is therefore able to obtain a much more desirable flat torque speed characteristic.

The capacitor 46 plays an important part in the smooth operation of the motor at low speeds. With the increased field strength resulting from the provisions of diode 30 and resistor 28 and the addition of the diode 32, the back E.M.F. becomes relatively high and the control may be somewhat rough on occasions. The addition of the capacitor 46 connected as shown results in a smooth control even at low speeds and an extremely flat torque speed characteristic is thereby achieved at any speed.

Figure 5:
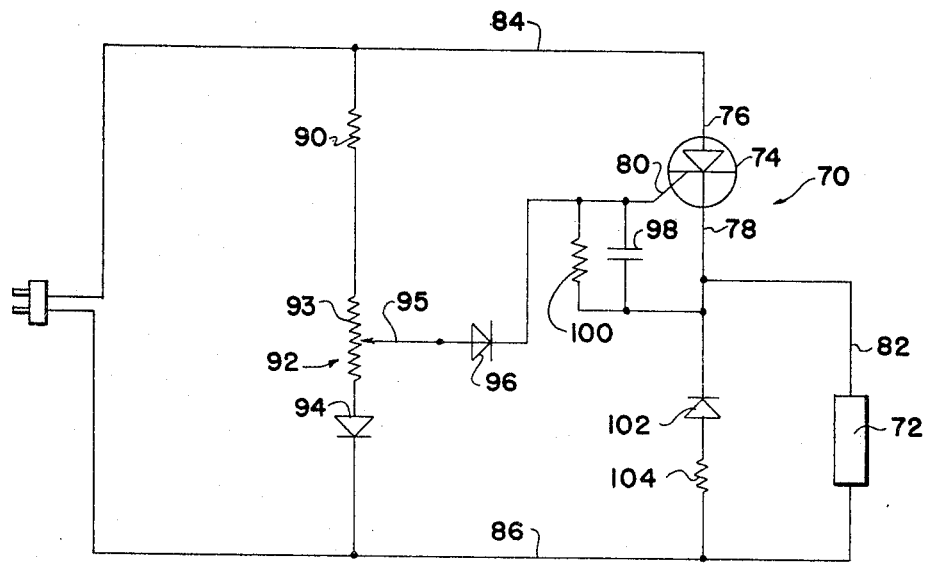
FIG. 5 is a schematic view illustrating another preferred specific embodiment of a universal motor speed control circuit of the invention.

Another preferred specific embodiment of the invention is illustrated in FIG. 5 of the drawings and is shown generally at 70 and the motor or load associated with the circuit of the invention is shown at 72. The motor or load 72 can include suitable windings such as shown at 12 and 14 in FIG. 1. A controlled rectifier, preferably a silicon controlled rectifier, is provided and is shown generally at 74 and includes an anode electrode 76, a cathode electrode 78 and a gate electrode 80. The cathode electrode 78 is connected to one end of the motor winding or load 72, either directly or by use of a conductor 82. The anode 76 of the rectifier 74 and the other end of the load 72 are connectible to a source of A.C. voltage in any suitable manner, such as by the use of conductors 84 and 86, respectively.

A gating circuit is provided for the gate electrode 80 of the controlled rectifier 74 and the gating circuit illustrated in the drawings includes a fixed resistor 90, a variable resistor 92 and rectifier means, preferably a crystal rectifier shown at 94. The elements 90, 92 and 94 are connected in series and are connected in parallel with the controlled rectifier 74 and the load 72 to the source of A.C. voltage, such as by connection to the conductors 84 and 86. The variable resistor or potentiometer 92 includes a resistor 93 which is in series with the resistor 90 and the rectifier 95 and a wiper arm 95 which is movable along the resistor 93 in the usual and common manner. Second rectifier means, preferably of the crystal rectifier type, is provided and shown at 96 and is preferably connected to the wiper arm 95 of the variable resistance 92 and to the gate electrode 80 of the controlled rectifier 74. The connection of the crystal rectifiers 94 and 96 as illustrated in the drawings is such that energy is provided to the gate electrode 80 only during the positive half cycle of the applied A.C. voltage. The connection of the rectifiers 94 and 96 is thus associated with the connection of the controlled rectifier 74 so that the gating potential is available only during that portion of the cycle when the rectifier 74 can pass electrical energy.

A capacitor 98 and a fixed resistor 100 are preferably provided and are connected in parallel to each other and each have one side connected between the gate electrode 80 and the crystal rectifier 96 as illustrated in the drawings. The other sides of the capacitor 98 and resistor 100 are electrically connected to an end of the motor winding or load 72 as shown in the drawings.

Other rectifier means, preferably a crystal rectifier as shown at 102, is provided and is connected in series with a fixed resistor 104 and the rectifier 102 and resistor 104 are connected in parallel to the winding or load 72, such as by connecting the ends thereof to the conductor 82 and the conductor 86. It will be observed that the connection of the rectifier 102 is opposite from that of the controlled rectifier 74 so that current passes through resistor 104 and then through rectifier 102 while current from the controlled rectifier 74 is blocked through this parallel circuit by the connection of the rectifier 102.

Figure 6:
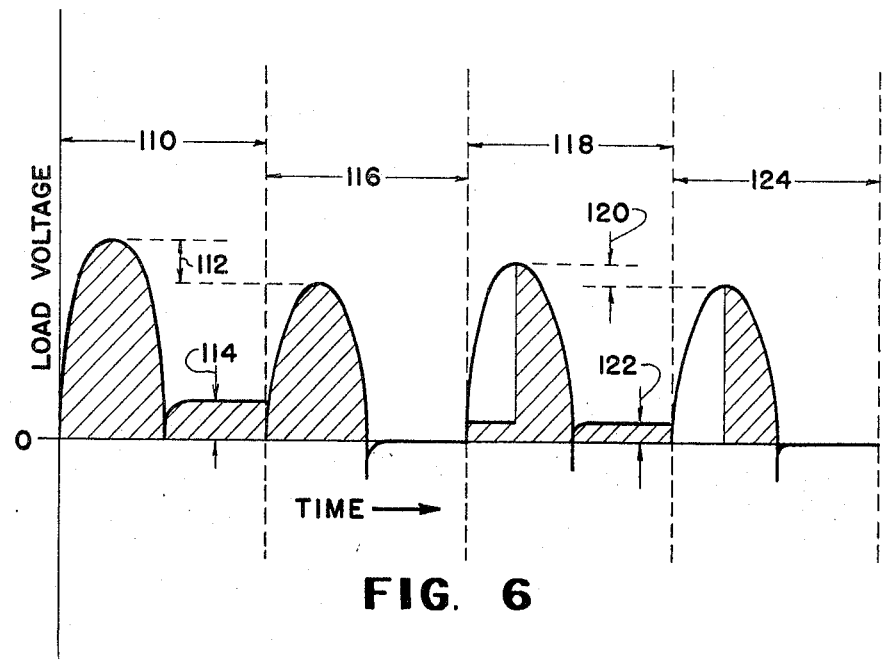
FIG. 6 is a diagrammatic view showing the load voltage plotted against time and illustrating portions of the electrical energy supplied to a load under various operating conditions.

In operation and on assuming an applied voltage as shown in FIG. 2 of the drawings, the wave forms shown in FIG. 6 of the drawings can be provided across the load 72. The applied voltage supplied to the gating circuit will provide the necessary gating potential to the gate electrode 80 of the controlled rectifier 74 at the time in the applied voltage determined by the setting of the wiper arm 95 on resistor 93 and substantially all of the applied voltage, substantially none of the applied voltage, and intermediate portion of the applied voltage can be supplied to the load depending upon the setting of the wiper arm 95.

When the rectifier 74 is gated into a conducting state then the balance of the positive half cycle of the applied voltage remaining will be supplied to the load 72 for operation of the motor. Thus, the amount of energy supplied to the load or motor is determined by positioning of the wiper arm 95 which results in triggering or gating of the controlled rectifier early or late in the half cycle of the applied voltage. As the motor accelerates back E.M.F. is developed and the controlled rectifier will stop conducting and the speed of the motor will be regulated about the point determined by the positioning of the wiper arm 95 or resistor 93. As a load is applied to the motor 72 the back E.M.F. is reduced as a result of reduction of speed of the motor caused by application of the load and thus the cathode electrode 78 of the control rectifier 74 becomes more negative than the gate 80 and the control rectifier conducts, once more applying voltage to the load. The additional voltage applied to the load increases the motor speed and it will be seen that the amount of energy supplied to the motor is directly a result of the back E.M.F. generated in operation.

FIG. 6 of the drawings illustrates load voltages under various operating conditions. The first cycle of the applied voltage is shown at 110 and the load voltage is for full speed of the motor, with no load on the motor, the shaded portion of the diagram indicating the load voltage with that portion shown at 112 and 114 representing the effect of the back E.M.F. The next cycle of the applied voltage is shown at 116 and is for full speed of the motor at full load with the shaded area illustrating the amount of the voltage applied to the load. Substantially an entire half cycle of the applied voltage is supplied to the load. The next cycle of the applied voltage is shown at 118 and illustrates the load voltage when the motor is operating at half speed with no load being appleid to the motor. Under these conditions back E.M.F. is generated and the effect of the back E.M.F. is illustrated at 120 and 122. In the final half cycle of the applied voltage shown in the drawings at 124, the load voltage illustrated is for the motor operating at half speed and with the motor having a full load. The shaded portion of the diagram between the lines 124 indicates the applied load voltages under these conditions.

The function of the resistor 104 and crystal rectifier 102 is the same as that provided by the diode 30 and the resistor 28 of FIG. 1. This portion of the circuit increases the back E.M.F. and thus the amount of control of the motor available. The value of the resistor 104 is selected to control the effect of the rectifier 102 and resistor 104 can be adjusted to give a very smooth control even at very low speeds.

Both of the preferred specific embodiments of the universal motor speed control means of the invention are quite desirable and in operation the back E.M.F. generated by operation of the motor is utilized in control of the energy supplied to the load or motor. In both circuits means are provided to increase the back E.M.F. to obtain effective and desirable motor speed control even at relatively low speeds where ordinarily very little back E.M.F. is generated. Thus, improved motor control means have been provided in comparison with prior art devices wheer the relatively small amount of back E.M.F. generated is not effective for smooth motor control at low speeds.

While the universal motor speed control means of the invention have been described in connection with preferred specific embodiments thereof, it will be understood that such is intended to illustrate and not to limit the scope of the invention which is described in the claims.

We claim:

1. A series motor speed control circuit comprising, in combination, a motor field winding and a motor armature winding connectible to a source of A.C. voltage, a silicon controlled rectifier connected between said field winding and said armature winding with said silicon controlled rectifier having the anode thereof connected to one end of said field winding and having the cathode thereof connected to one end of said armature winding, a first fixed resistance and a first diode connected in series with each other and connected in parallel to said silicon controlled rectifier and to said armature winding, a second diode connected in parallel to said armature winding and having the polarity thereof opposite to the polarity of said first diode, a gating circuit for said silicon controlled rectifier including a second fixed resistance connectible to a source of A.C. voltage and to a third diode, said gating circuit further including a variable resistance connected in series with said third diode and with a third fixed resistance and a fourth diode with said fourth diode being connected to the gate electrode of said silicon controlled rectifier, said third and fourth diode having like polarity and being connected to permit passage of energy during the same half-cycle of applied voltage as said silicon controlled rectifier passes energy, and a capacitor connected to the other end of said armature winding and to said gating circuit between said variable resistance and said third fixed resistance, said motor speed control circuit being constructed and adapted so that said gating circuit and said field and armature windings can be connected to a source of A.C. voltage and with said variable resistance being adjustable to vary the gating time of said silicon controlled rectifier and thereby regulate the amount of electrical energy provided to said armature winding.

2. A motor speed control circuit comprising, in combination, a motor field winding and a motor armature winding connectible to a source of A.C. voltage, a controlled rectifier connected between said field winding and said armature winding and having a gate electrode, a first diode and a resistor connected in series with each other and connected in parallel to said controlled rectifier and said armature winding, a second diode connected in parallel to said armature winding, and a gating circuit connected to said gate electrode of said controlled rectifier and connectible to a source of A.C. voltage with said gating circuit having a variable resistor, said motor speed control circuit being constructed and adapted so that adjustment of said variable resistor of said gating circuit regulates the time of firing of said controlled rectifier to thereby regulate the amount of energy supplied to said armature winding during a half cycle of the applied voltage and with said first diode permitting passage of electrical energy through said field winding during the entire half cycle of operation.

3. A motor speed control circuit as claimed in claim 2, in which said second diode is connected to said armature winding with its polarity opposite to the polarity of said first with respect thereto.

References Cited by the Examiner

UNITED STATES PATENTS

| | | |
|---|---|---|
| 3,041,478 | 6/1962 | Gabor. |
| 3,064,174 | 11/1962 | Dinger _____ 318—331 |
| 3,165,688 | 1/1965 | Gutzwiller _____ 318—246 |

OTHER REFERENCES

F. W. Gutzwiller, G.E. Application Note 200.4, 6/61, "Universal Motor Speed Control," pages 3–7.

ORIS L. RADER, *Primary Examiner.*

S. GORDON, J. C. BERENZWEIG, *Assistant Examiners.*